(12) United States Patent
Persson et al.

(10) Patent No.: US 7,120,532 B2
(45) Date of Patent: Oct. 10, 2006

(54) DEVICE AND METHOD FOR DETERMINING A HIGHEST ALLOWED VELOCITY OF A VEHICLE

(75) Inventors: Per-Åke Persson, Växjö (SE); Göran Eliasson, Braås (SE); Thomas Engström, Växjö (SE)

(73) Assignee: Volvo Articulated Haulers AB, Växjö (SE)

(*) Notice: Subject to any disclaimer, the term of this patent is extended or adjusted under 35 U.S.C. 154(b) by 0 days.

(21) Appl. No.: 10/065,619

(22) Filed: Nov. 4, 2002

(65) Prior Publication Data

US 2003/0088354 A1 May 8, 2003

Related U.S. Application Data

(63) Continuation of application No. PCT/SE01/00933, filed on Apr. 30, 2001.

(30) Foreign Application Priority Data

May 2, 2000 (SE) .................................... 0001586

(51) Int. Cl.
*B60T 8/32* (2006.01)

(52) U.S. Cl. .............................. 701/93; 701/97; 701/70

(58) Field of Classification Search ................. 701/93, 701/94, 95, 96, 70, 78, 81, 84; 303/100, 303/93, 20, 94–97, 102, 104, 113, 103, 109, 303/110, 92, 95; 180/170–179
See application file for complete search history.

(56) References Cited

U.S. PATENT DOCUMENTS

| | | | | |
|---|---|---|---|---|
| 4,531,300 A | | 7/1985 | Heidel et al. | 33/366 |
| 4,779,202 A | * | 10/1988 | Leiber | 303/100 |
| 4,811,808 A | * | 3/1989 | Matsumoto et al. | 303/100 |
| 4,843,553 A | * | 6/1989 | Ohata | 180/179 |
| 4,964,679 A | | 10/1990 | Rath | 303/100 |

FOREIGN PATENT DOCUMENTS

DE  19615311 A1  10/1997

\* cited by examiner

*Primary Examiner*—Richard M. Camby
(74) *Attorney, Agent, or Firm*—Novak Druce & Quigg, LLP

(57) ABSTRACT

Method and device for the determining a maximum allowed velocity ($V_{max}$) for a vehicle (1) when going downhill (2). The invention includes a detector (11) for detection of current inclination (alpha) of the vehicle (1) in relation to a horizontal plane (3), and means (10) for the determination of a value relating to the maximum allowed velocity ($V_{max}$) of the vehicle in dependence of at least the value of the inclination (alpha). The invention also relates to a procedure for the control of the velocity. The invention provides a procedure for velocity control that takes the inclination into account when going downhill.

8 Claims, 1 Drawing Sheet

DEVICE AND METHOD FOR DETERMINING A HIGHEST ALLOWED VELOCITY OF A VEHICLE

CROSS REFERENCE TO RELATED APPLICATIONS

The present application is a continuation of International Application No. PCT/SE01/00933, filed Apr. 30, 2001 and published in English pursuant to PC-T Article 21(2), now abandoned, and which claims priority to Swedish Application No. 0001586-7 filed 2 May 2000. Both applications are expressly incorporated herein by reference in their entireties.

BACKGROUND OF INVENTION

1. Technical Field

The present invention relates to an arrangement for determining a maximum allowed velocity of a vehicle when going downhill when braking capabilities are considered. More specifically, the invention relates to a method for determining a maximum allowed velocity of a vehicle taking into account the inclination of the vehicle and at least one other aspect of the vehicle's braking capability.

2. Background Art

The transportation of heavy loads, such as that often performed commercially by contractors, can and is frequently performed using vehicles of the articulated hauler type. These types of vehicles may be chosen because of their capabilities to operate with large and heavy loads in areas where there are no roads. Example settings for such implementation include load transport in connection with road and tunnel building, sand pits, mines and similar environments.

These types of articulated haulers are typically constructed with a forward vehicle section, often referred to as the engine unit and including a forward frame that supports an engine and a front wheel axle. Further, haulers of this type normally have a rear vehicle section taking the form of a load-carrying unit including a rear frame that supports two wheel axles, a forward bogie axis and a rear bogie axis. The vehicle is commonly designed for switching between operations using various driving wheel combinations, all six wheels on the three axes being selectively operable as driving wheels, depending on the prevailing operating conditions. An articulated hauler may have a weight in the order of 15–30 metric tons and may be loaded with a payload in the order of 20–35 tons.

In a typical articulated hauler, the frame of the engine unit is connected to the frame of the load-carrying unit by means of a special articulation joint. This joint allows the engine unit and the load-carrying unit to pivot in relation to each other about an imaginary longitudinal axis essentially extending in the longitudinal direction of the vehicle. This articulation joint also allows pivoting about a vertical axis for steering of the vehicle. In this manner, the engine unit and the load-carrying unit are allowed to move substantially independently of each other. This reduces the stress loads acting on the vehicle, especially when operating in difficult or complex terrain.

Normally, an articulated hauler is equipped with a diesel engine and an automatic transmission having, for example, six forward gear ratios and two reverse gear ratios. For braking of the vehicle, an operating brake system is used, preferably of the hydraulic type and divided into two circuits; one circuit intended for the engine unit and another circuit intended for the load-carrying unit. The brake system includes conventional disc brakes arranged for braking the respective wheels. With respect to the transmission, there is normally an integrated retarder; that is, an hydraulic brake device that acts on a turbine shaft of the transmission for braking the vehicle.

During braking of the hauler, the driver uses a brake pedal designed in such a way that when depressed, it initially causes activation of a retarder. When depressed further, the mechanical or operating brakes are also activated and caused to operate in cooperation with the retarder. The reason for first activating the retarder is to help control the high thermal loads affecting the operating brake during mechanical braking. Thus, by primarily using the retarder, or at least initially using the retarder, reduced wear of the operating brake system is achieved and an increased operator braking comfort is also realized.

Such haulers are also often suitably equipped with a separate retarder pedal that, when depressed, will only cause braking by means of the retarder.

Further, the hauler normally includes an additional brake function in the form of a motor-brake that is a typically occurring braking function of diesel engines. A motor-brake is controlled by means of a separate control and includes a throttle that, when actuated, will restrict the flow of exhaust gases from the engine during its exhaust phase. This creates a back pressure in the exhaust system that in turn causes a braking effect.

In the case of articulated haulers, it is a general demand that the machine be able to be run at as high a velocity as possible. The choice of velocity, however, has to be made considering expected costs that may occur as a consequence of service and possible repairs required if too high a velocity is chosen.

In order to limit the velocity of an operating hauler, the driver can brake entirely with the operating brake. This way of braking however, presents a problem because the ordinary disc brakes of the operating or mechanical brake system is not designed to be continuously used for extended periods of time. This can particular be the case when braking occurs while the vehicle is traveling downhill while burdened with a heavy load. In such cases, the mechanical brakes may become overloaded, which in turn can result in a reduced braking ability and/or an unnecessary increase in brake-component wear.

To spare the operating brake, the retarder or motor-brake should be predominantly utilized. An existing problem, however, is that drivers do not always pay attention to directions given regarding which kind of brake that is the correct at different situations. Instead, they use the operating brake too frequently. Furthermore, there is a risk that drivers will not pay attention to the instructions and directions regarding braking procedures, and also run the vehicle at too fast of speeds and use the operating brake too much which compounds the detrimental effects that are suffered by the vehicle.

The above problem is especially serious when the hauler is traveling downhill with a heavy load. In such situations, it is possible for the velocity to become too high, while there is also a risk that the retarder and the exhaust gas brake will not be capable of delivering sufficient brake power to bring such excessive speed under control. From an alternative perspective, it may be considered that the retarder and the motor-brake have insufficient cooling capabilities regarding the overall braking functions. In any case, because the operating brake must also be used to reduce the machine's velocity, a risk for excessive wear and damage to the operating brake system exist.

SUMMARY OF INVENTION

One of the purposes of the present invention is to provide an improved arrangement for controlling the velocity of an articulated hauler, particularly when going downhill as discussed in detail hereinabove. This purpose is achieved by way of an arrangement and that arrangement's operation in which retarding systems are preferentially used for retarding the forward travel of a vehicle, which may exemplarily take the form of an articulated hauler.

Exemplarily, the arrangement includes a detector for detecting the current inclination of the vehicle in relation to a horizontal plane, as well as an arrangement or means for determining a value concerning the maximum allowed velocity of the vehicle in dependence of at least the value of said inclination.

By way of the invention, an advantage is obtained in that it permits an optimized utilization of the vehicle's brake functions. In turn, the invention also enables the vehicle to be run at a high-as-possible velocity in the long run, while, at the same time, sparing the operating or mechanical brake system which normally takes the form of disc brakes of a mechanical nature.

A further purpose with the invention is to provide an automatic limitation of the maximum velocity of the incorporating vehicle. To achieve this purpose, the brake functions of the vehicle are arranged to be activated automatically by means of a control unit, thus running the vehicle at below a predetermined maximum velocity while at the same time assuring that the brake functions are used optimally.

According to a preferred embodiment of the invention, information regarding the current load of the vehicle and the current braking ability for the different brake functions can also be used and form a base for determining said maximum value concerning the vehicle's velocity.

BRIEF DESCRIPTION OF DRAWINGS

The invention will be explained more fully in the following, with reference to a preferred embodiment or example that is further disclosed in the included drawings, in which.

DETAILED DESCRIPTION

Figure 1:
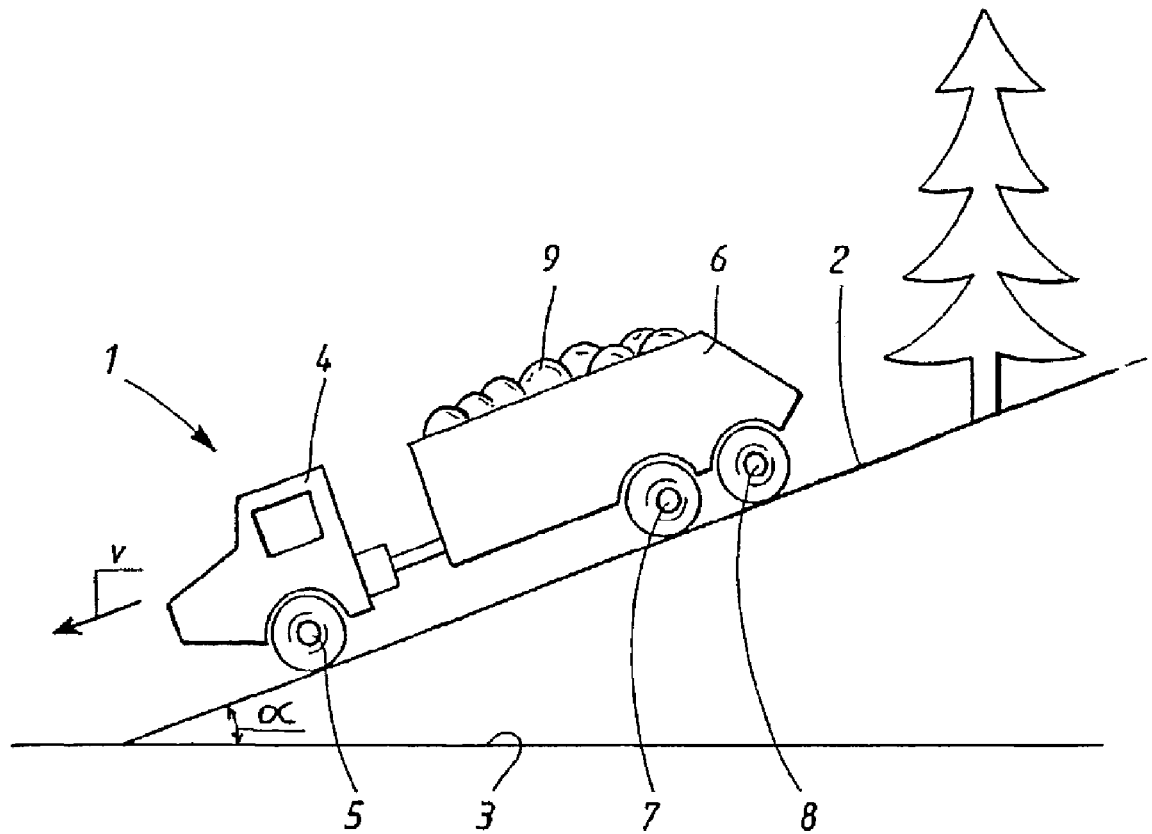
FIG. 1 is a simplified schematic side elevational view of an exemplary articulated hauler traveling downhill.

FIG. 1 shows a simplified schematic side view of an articulated hauler 1 in which the present invention can be incorporated. It should be appreciated, however, that the invention is not limited to use in only these kinds of vehicle, but can also be used in all kinds of vehicles where it is desirable to control and limit the vehicle's velocity when the vehicle is going downhill. In this instance, the invention includes a determination of a maximum allowed velocity for such a driving case.

FIG. 1 thus shows a situation where an articulated hauler 1 is representatively traveling down a hill 2. The hill 2 has a certain inclination (alpha) which is measured with respect to a horizontal plane 3. The hauler 1 is understood to be being run along the hill in the downhill direction at a certain velocity (v) represented by the lead arrow ahead of the hauler 1.

An articulated hauler 1 is a vehicle of known type and therefore the complete vehicle will not be described in detail. Instead, the description will be limited to those components and functions of the vehicle necessary for an understanding of the invention.

The hauler 1 includes an engine unit 4 with a front wheel axle 5 that is conventionally arranged. The hauler 1 also has a load-carrying unit 6 having two wheel axles such as a forward bogie axle 7 and a rear bogie axle 8. All of these wheel axles 5, 7, 8 may be put on brake by an operating or mechanical brake system that is suitably arranged in the form of two brake circuits. A first brake circuit is provided for the engine unit 4 and a second brake circuit is provided for the load-carrying unit 6. In an exemplary embodiment, the operating brake system includes disc brakes that conventionally work on respective wheels of the hauler 1. Further, the hauler 1 is assumed to be loaded with a certain load 9 at the load-carrying unit 6.

Beside the above operating brake system, the hauler 1 is also equipped with additional brake functions. These functions or additional braking systems can include a retarder integrated at the transmission of the hauler 1, typically adjacent to an engine of the vehicle on the engine unit 4 and of conventional design. A further brake function in the form of an engine brake can also be provided on the hauler 1. In a known manner, such an engine brake includes a throttle or restrictor that is controlled by a control member and is utilized to resist the outflow of exhaust gases from the engine in the exhaust phase. This creates a back pressure in the exhaust system, which can be used to brake the vehicle. The retarder, as well as the engine brake, can be activated by the driver via suitable physical controls of known configuration. According to the invention(s) described in detail below, the retarder and the engine brake can also, if necessary, be activated automatically by a dedicated control unit function. From a physical stand point, this controller may also be of a stand-alone nature.

Figure 2:
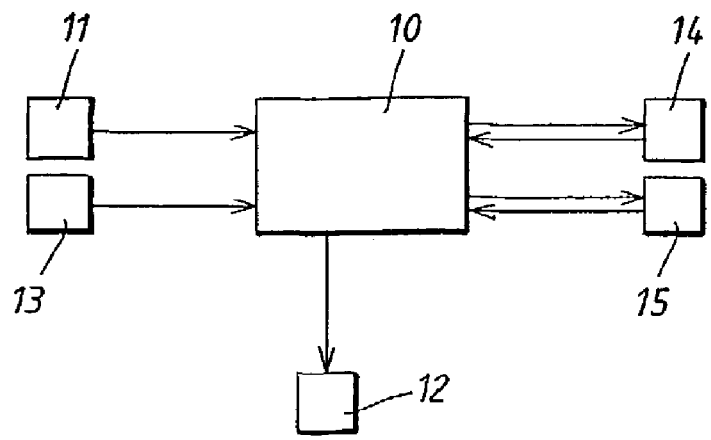
FIG. 2 is a block diagram, which in simplified form, demonstrates a construction and exemplary function of the invention.

Due to the problem described above concerning the risk of too high of a thermal load being imposed in the operational brake system, it is a basic principle behind the present invention that a value of a maximum allowed velocity ($v_{max}$) of the hauler 1 be calculated when running downhill on an inclined ground surface 2. Preferably, this value is calculated at periodically recurrent occasions within a certain predetermined interval. For this purpose, the hauler 1 has a computer-based control unit 10 that is arranged to determine a value of the maximum allowed vehicle velocity ($v_{max}$) depending on the angle of inclination (alpha) of the slope 2. A block diagram is utilized in FIG. 2 to exemplarily demonstrate the functional interaction of the systems and features of the invention(s). This velocity value ($v_{max}$) can be considered to correspond to a velocity that the hauler 1 can be permitted to run without risking permanent damage to the operational brake system.

In order to determine the maximum velocity ($v_{max}$) the control unit 10 includes a stored table in computer-type memory, and which defines a relationship between the inclination (alpha) and the maximum permissible velocity ($v_{max}$) that will be allowed for respective values of inclination (alpha).

In order to determine a value of the current inclination (alpha), an inclination indicator 11 is arranged in the vehicle 1 and connected to the control unit 10. Inclination indicators are known devices, and will therefore not be described in detail. The inclination indicator 11 according to the invention, however, delivers a signal to the control unit 10 that corresponds to a value of the current inclination (alpha) of the hauler 1 taken with respect to the hauler's longitudinal direction and in relation to a horizontal axis or plane 3. The hauler 1 may, for example, be expected to be run downhill with an inclination that may amount to as much as 25° from horizontal. From the information acquired by means of the inclination sensor 11, the control unit then uses such a table as mentioned above to determine or "read" a value of the maximum allowed velocity ($v_{max}$) that will be permitted. This value may exemplarily be indicated to the driver of the hauler 1 via, for instance, a display unit 12 suitably arranged in close vicinity of the driver's seat in the hauler 1.

With said information, the driver can assure that the maximum velocity $v_{max}$ is not exceeded when going downhill 2. For this purpose, the driver may activate the different brake function of the hauler 1. For the reasons described above, usage of the operating brake system is to be restricted as much as possible. Instead, it is desired that the driver mainly use the retarder and the motor-brake in order to brake the hauler 1 and adapt its velocity (v) in such a way that it never exceeds the indicated maximum value ($v_{max}$).

The information concerning maximum allowed velocity may also be transferred to the driver via, for example, an aural signal, suitably in the form of an alarm that sounds when the hauler 1 is about to reach a velocity corresponding to the maximum allowed speed. For this purpose, the control unit 10 is arranged to activate such an alarm signal at, or in the vicinity of, a suitable limit concerning the maximum speed value, which in turn depends on the current inclination according to an appropriate sensor reading.

In order to create basis for a more accurate determination of the maximum velocity ($v_{max}$) of the hauler 1, a value corresponding to the above-mentioned weight of the load 9 being carried by the hauler 1 may be determined by the control unit 10. For this purpose, the control unit 10 is preferably connected to an additional sensor 13 for this weight measure. Suitable sensors of this nature are known and may suitably include one or more tension sensors, which by an appropriate placement on the platform of the load-carrying unit 6 may be used to provide a measure corresponding to the weight of the load 9. As an alternative to this kind of sensor, an otherwise suitable sensor operable in connection with the suspension system of the vehicle can be used in which the measure of, for instance, the degree that the vehicle rebounds during travel can be used to estimate the weight of the load 9.

Preferably, a value concerning the weight of the load 9 is delivered to the control unit 10 in an automated manner. Depending on this measure, and also the above-mentioned measure concerning the downhill inclination (alpha) of the vehicle, the maximum allowed velocity ($v_{max}$) of the hauler 1 may be determined by using a "look-up" style table stored in the control unit 10 which indicates a relationship between the inclination, the weight of the load and the preferably allowable velocity of the vehicle.

For certain cases, it is not sufficient to only indicate the maximum velocity via an indicator 12 in the form of a display or alarm for the driver. There is a risk that the driver may not heed the information concerning maximum allowed velocity and permit the vehicle to operate under conditions that are not prescribed. For this reason, the invention may instead be used for active and automatic control of one or more additional brake functions in the brake system of the hauler 1. For this purpose, the control unit 10 is connected to, and arranged for affecting automatic activation of a retarder of the nature described hereinabove, and which is schematically disclosed in FIG. 2 where this function is indicated with the reference numeral 14.

The control unit 10 is also arranged for control of the above-mentioned motor brake in a corresponding way, which is indicated schematically with the reference numeral 15. In order to enable this control, the retarder as well as the motor-brake are arranged in such a way that they can be activated without the driver having to push a pedal or physically cause similar activation.

Thus, the invention admits an active control of the retarder and/or motor brake function in dependence on a value of the maximum allowed velocity ($v_{max}$) calculated or read by the control unit 10. Since it is important to avoid unnecessary use of the operating brake, the invention is arranged to activate, for example, the retarder at an early stage, for example, when the hauler 1 is about to approach the maximum allowed velocity ($v_{max}$).

In order to create basis for a more accurate determination of the maximum vehicle velocity ($v_{max}$), the invention may be arranged to keep the information regarding the available braking capacity of the retarder 14 and the motor-brake, respectively, available in the control unit 10. This information may then be considered in the calculation of the maximum allowed velocity ($v_{max}$). Concerning for example the retarder 14, it provides a brake moment that varies depending on the current gear and the current velocity of the hauler 1. The brake moment may be calculated by means of the control unit 10, by means of which a value of its available brake moment can be used when determining the maximum allowed velocity ($v_{max}$) The motor-brake 15 may also provide a brake moment depending on current gear and current velocity conditions. The brake moment available at the retarder 14 and the motor-brake 15 may also depend on the cooling capacity available in the vehicle, which in turn depends on the surrounding outside temperature. Such factors as this may even be considered when determining the maximum allowed velocity ($v_{max}$) Finally, the operating brake of the hauler 1 is typically designed with a previously known (and constant) maximum brake moment.

The invention shall not be considered to be limited to the embodiments described above and depicted in the drawings, but may be varied within the scope of the appended claims. For example, the invention is not limited to utilization in articulated haulers, but can be employed in various types of vehicles in which there is a requirement for control or limitation of velocity when going downhill, and which in particular include a motor-brake and/or a retarder onboard.

Further, different types of sensors may be used for measuring the inclination of the vehicle and the weight of the load.

Finally, other factors than those described above may be used for the determination of a maximum allowable velocity ($v_{max}$) for the hauler 1. By way of example, a factor describing, for example, the current road conditions may be considered.

The invention claimed is:

1. An arrangement for determining a maximum allowable velocity ($V_{max}$) of a vehicle descending downhill, the arrangement comprising:
    a vehicle comprising a wheel brake system and a retarder constituting an additional braking function on the vehicle;
    a detector that detects when the vehicle is descending downhill; and
    a computing means for determining a current braking cability of the retarder and a maximum allowable descending velocity ($V_{max}$) of the vehicle that must be maintained in order to enable the retarder to control the descending vehicle, to the exclusion of the wheel brake system, during the detected downhill descent.

2. The arrangement as recited in claim 1, wherein the computing means is connected to an indicator device having a capability to indicate a computed value of the maximum allowable velocity to a driver of the vehicle.

3. The arrangement as recited in claim 1, wherein the computing means initiates automatic activation of the retarder when the maximum allowable descending velocity ($V_{max}$) is detected.

4. The arrangement as recited in claim 1, wherein the computing means further senses and considers a detected load weight of the vehicle in the ascertainment of the maximum allowable descending velocity ($V_{max}$) of the vehicle.

5. A method for determining a maximum allowable velocity ($V_{max}$) of a vehicle descending downhill, the method comprising:

providing a vehicle comprising a wheel brake system and a retarder constituting an additional braking function on the vehicle;

detecting when the vehicle is descending downhill; and determining a current braking cability of the retarder and a maximum allowable descending velocity ($V_{max}$) of the vehicle that must be maintained in order to enable the retarder to control the descending vehicle, to the exclusion of the wheel brake system, during the detected downhill descent.

6. The method as recited in claim 5, wherein the computing means is connected to an indicator device having a capability to indicate a computed value ($V_{max}$) indicative of a maximum allowable velocity to the driver of the vehicle.

7. The method as recited in claim 5, wherein the computing means automatically activates the retarder when a maximum allowable long-term velocity ($V_{max}$) is detected.

8. The method as recited in claim 5, wherein the computing means further senses and considers a detected load weight of the vehicle in the ascertainment of the maximum allowable long-term velocity ($V_{max}$) of the vehicle.

* * * * *